United States Patent
Smeets et al.

(10) Patent No.: US 6,334,831 B1
(45) Date of Patent: Jan. 1, 2002

(54) DRIVE BELT, TRANSVERSE ELEMENT THEREFOR AND TRANSMISSION IN WHICH THIS IS USED

(75) Inventors: Paulus Maria Smeets, Tilburg; Roland Theo Anton Kals, Oisterwijk, both of (NL)

(73) Assignee: Van Doorne's Transmissie B.V., Tillburg (NL)

(*) Notice: Subject to any disclaimer, the term of this patent is extended or adjusted under 35 U.S.C. 154(b) by 0 days.

(21) Appl. No.: 09/484,275

(22) Filed: Jan. 18, 2000

(30) Foreign Application Priority Data

Jan. 18, 1999 (NL) .............................................. 1011050

(51) Int. Cl.[7] .............................. F16G 1/21; F16G 5/16
(52) U.S. Cl. ........................ 474/245; 474/242; 474/201; 474/244
(58) Field of Search ................................ 474/242, 201, 474/265, 244, 245, 237, 240

(56) References Cited

U.S. PATENT DOCUMENTS

| | | | | |
|---|---|---|---|---|
| 3,949,621 A | * | 4/1976 | Beusink ...................... | 474/201 |
| 4,642,077 A | * | 2/1987 | Hattori et al. .............. | 474/201 |
| 4,976,663 A | * | 12/1990 | Hendrikus .................. | 474/242 |

FOREIGN PATENT DOCUMENTS

| | | |
|---|---|---|
| EP | 0 366 169 | 5/1990 |
| JP | 01 040737 | 5/1989 |

* cited by examiner

Primary Examiner—David A. Bucci
Assistant Examiner—Marcus Charles
(74) Attorney, Agent, or Firm—Young & Thompson

(57) ABSTRACT

Drive belt (10) for a continuously variable transmission, as for use in motor vehicles, having transverse elements (20) and at least one endless carrier. The transverse elements (20) are each provided with a recess (21), which extends between a first and a second main face (22 and 23, respectively) of a transverse element (20), which main faces are oriented transversely to the intended direction of movement (C) of the drive belt (10). The recess (21) offers accommodation for the carrier (30) and at least is bounded by an abutting face (24), intended to come into contact with a main face (30') of the carrier (30), and a boundary face (25), which is oriented transversely thereto and restricts the freedom of movement of the carrier (30) in the axial direction. The boundary face (25) merges into the first main face (22) and into the second main face (23) via transition edges (27, 27'), characterised in that the radius of curvature (R) of at least one transition edge (27) is less than 0.2 mm.

12 Claims, 3 Drawing Sheets

DRIVE BELT, TRANSVERSE ELEMENT THEREFOR AND TRANSMISSION IN WHICH THIS IS USED

BACKGROUND OF THE INVENTION

The invention relates to an endless drive belt for a continuously variable transmission.

DESCRIPTION OF THE RELATED ART

A drive belt of this type is generally known, in particular from the patent publication EP-A-0 366 169. The known drive belt comprises a number of transverse elements, each of which is provided with at least one recess which extends between a first and a second main face oriented transversely to the intended direction of movement of the drive belt. The recess offers accommodation for at least one endless carrier and is at least bounded by an abutting face intended for butting against a main face of the carrier and a boundary face oriented transversely thereto. During operation of the drive belt, the abutting face of a transverse element supports a main face of the carrier located on the inside of the carrier. The boundary face of a transverse element delimits the axial freedom of movement of the carrier with respect to the transverse element. The boundary face merges into the first and into the second main face at transition edges. With this arrangement the transition edges are rounded with a certain radius of curvature, such that the boundary face smoothly adjoins the first and the second main face. What is achieved by this means is that physical contact between the carrier and a transverse element is smoothly built up and run down. Thus, when the carrier and the transverse element move relative to one another wear of the drive belt as a consequence of a sharp transition edge is prevented. According to the said patent publication the radius of curvature of a transition edge is preferably greater than, but at least equal to, 0.2 mm.

JP-A-60 127 148 discloses a drive belt, the transverse elements of which are provided with rounded transition edges, the radius of curvature of which is preferably between 0.2 mm and 0.4 mm.

The patent publication JP-A-63 082 842 shows transition elements with which both the said transition edges and the boundary faces themselves are rounded. The radius at which the transition edges are rounded is greater than 0.2 mm.

SUMMARY OF THE INVENTION

The aim of the present invention is to provide a drive belt which is improved in qualitative terms and which does away with the apparent prejudice that a relatively large radius of curvature for the transition edges is needed for safe mutual contact between carrier and transverse element. The drive belt according to the invention is disclosed below.

The present invention is based on the insight that the relative movement between carrier and transverse element, where the carrier comes into contact with a boundary face or a transition edge, essentially occurs in situations in which the transfer of force between transverse element and carrier is relatively low. This is the case, in particular, at the location of a section of the carrier which extends in a straight line where the transverse elements are easily able to move in the longitudinal direction and in the axial direction of the carrier. In practice, it is found, surprisingly, that in the situations in which the transverse elements are under heavy load the carrier does not come into contact, or barely comes into contact, with a boundary face of the transverse element. The fact that in such situations the carrier is essentially centred on the abutting face and, as a consequence of this, does not come into contact, or barely comes into contact, with a boundary face or a transition edge contributes to this finding. According to the invention a possible supplementary explanation could also be that modern transmissions are laid out with some misalignment, which is greatest in the lowest transmission ratio of the transmission, or when pulling away, and consequently is relatively small in the highest transmission ratio. Consequently, the most harmful mutual contact between carrier and transverse element would occur only briefly. According to the invention a relatively small radius of curvature is sufficient in order substantially to prevent damage to the carrier and/or a transverse element as a consequence of mutual contact.

One advantage of the drive belt according to the invention is that a transition edge having a relatively small radius of curvature can be produced rapidly and with high accuracy in the material of the transverse element. This benefits the quality of the drive belt, since a drive belt of the type in question comprises a large number of transverse elements, so that even the smallest dimensional deviations between the individual transverse elements can lead to relatively high contact stresses. The high contact stresses have an adverse effect on the fatigue and the wear of the drive belt. Because the transverse elements according to the invention can be produced with high accuracy, the dimensional deviations of the transverse elements are small and a drive belt provided with such transverse elements will continue to function well for a long time.

A further advantage of the drive belt according to the invention is that the said radius of curvature can be applied with the aid of a tumbling process. In the tumbling process milling stones are brought into jolting contact with the transverse elements, as a result of which a rounding is produced over the entire periphery of the transverse element. The rounding of the transition edge in the known construction is usually produced with the aid of a sanding process. A sanding process that can be carried out relatively rapidly is the strip sanding process, in which a transverse element is brought into contact with a rapidly moving sanding strip at the location of a boundary face. Although the tumbling process is a slow process compared with the strip sanding process, for example disclosed in EP-A-0 366 169, a transition edge having a small radius of curvature according to the invention can be produced efficiently by the tumbling process. Advantageous characteristics of the tumbling process compared with a sanding process are the higher dimensional accuracy and improved reproducibility. A reduced spread in the sizing of the transverse elements from which a drive belt is made up benefits the quality of the drive belt. A supplementary advantage of the tumbling process compared with the sanding process is that the said radius of curvature is constant over essentially the entire length of the transition edge because deviations as a consequence of the side edges of a sanding strip curling up are avoided. Such deviations are reflected in a radius of curvature which changes over the length of the edge. Such a non-uniform rounding results in a variation in the local contact pressures between the carrier and a boundary face or a transition edge, as a result of which wear can locally be significantly higher than when the contact between carrier and transverse element is uniformly distributed over the boundary face or the transition edge. With the tumbling process advantageously essentially only profiling in the desired direction is produced.

The drive belt according to the invention also has the advantage that a relatively large proportion of a boundary face of the transverse elements is available for physical contact between carrier and transverse element, so that the contact stresses which arise during use of the drive belt can be lower than in the known construction.

According to the invention a transition edge having a radius of curvature of approximately 0.01 mm already suffices for recognisable reduction in the damage as a consequence of the said contact compared with a non-rounded transition edge. According to the invention, a transition edge having a radius of curvature in the range of 0.08±0.07 mm forms the optimum transition between the boundary face and the first or the second main face.

BRIEF DESCRIPTION OF THE DRAWINGS

The invention will be further explained below on the basis of illustrative embodiments and with reference to the figures.

DESCRIPTION OF THE PREFERRED EMBODIMENTS

Figure 1:
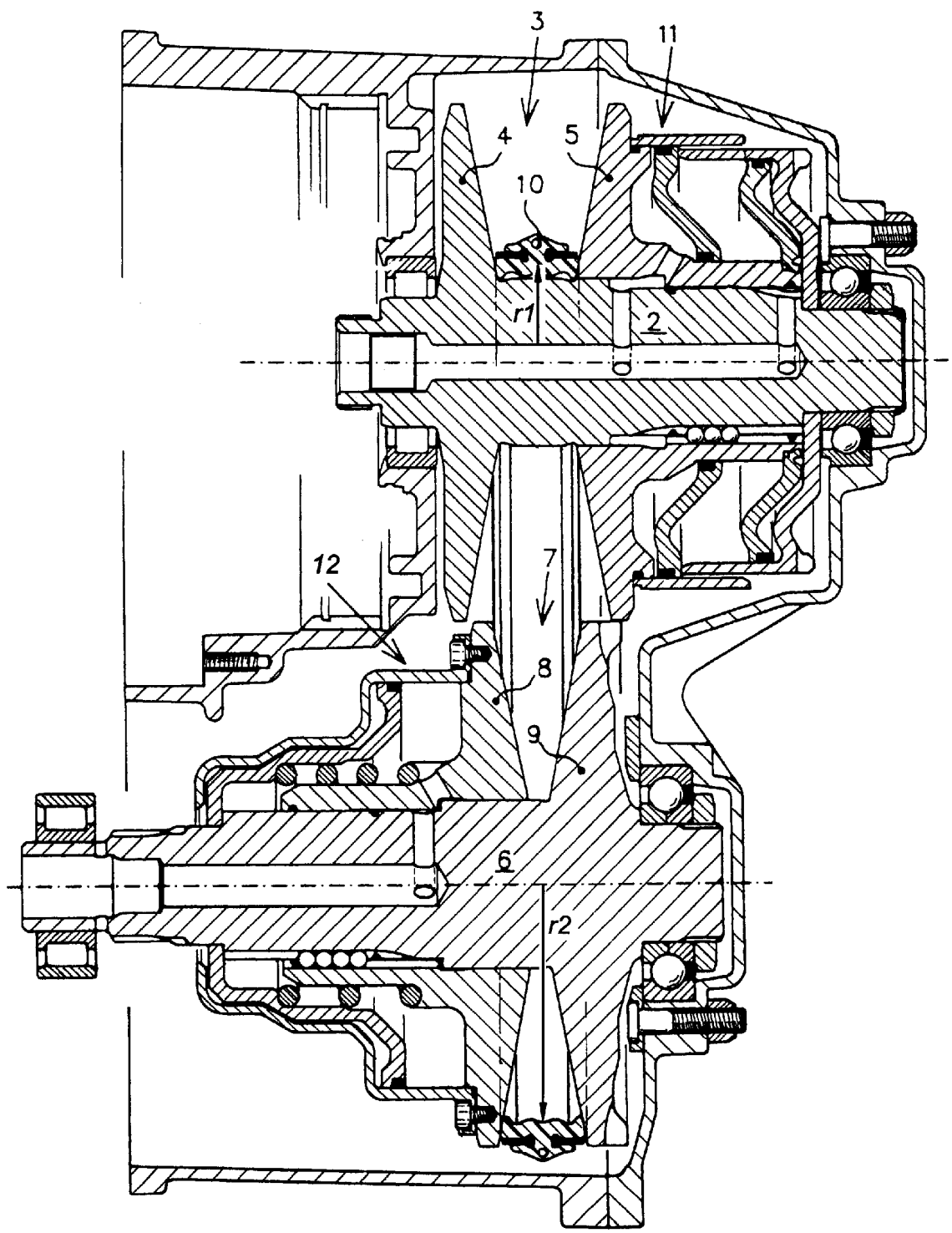
FIG. 1 shows, diagrammatically, a continuously variable transmission provided with a drive belt.

FIG. 1 shows a continuously variable transmission of the type for use in motor vehicles. In the transmission shown an endless drive belt 10 is wrapped around two pulleys 3 and 7, mounted opposite one another on individual pulley shafts 2 and 6, to transfer torque between the said pulley shafts 2 and 6. The pulleys 3 and 7 are each provided with two conical pulley discs 4 and 5 and, respectively, 8 and 9, which together form a V-shaped groove in which the drive belt 10 is fitted. The transmission ratio of the transmission 1 is given by the ratio of the running radii r1 and r2 of the drive belt in the V-shaped groove of the two pulleys 3 and 7, respectively. By moving the pulley discs 4 and 5 and, respectively, 8 and 9 of a pulley apart or towards one another with the aid of displacement means 11 and 12, respectively, it is possible to reduce or to increase the running radii r1, r2. The pulleys 3 and 7 are to this end provided with at least one movable pulley disc 5 and, respectively, 8. To transfer torque between the pulleys 3 and 7 the drive belt 10 is clamped under a certain force between the pulley discs 4, 5 and, respectively, 8 and 9.

Figure 2A:
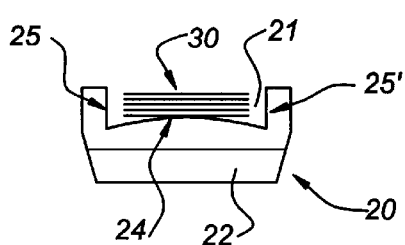
FIG. 2 shows two individual transverse elements.
Figure 2B:
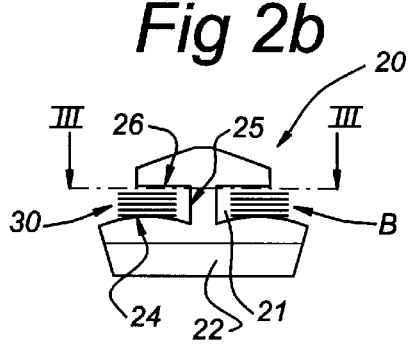

FIG. 2 shows two transverse elements 20 for use in a drive belt 10. The transverse elements 20 are provided with a recess 21, which extends between the front main face 22 and the rear main face 23 of the transverse element 20. The recess 21 offers accommodation for an endless carrier 30. In FIG. 2 the carrier 30 consists of a number of belts in strip form, which are shown in cross-section. The recess 21 is bounded by an abutting face 24 and two boundary faces 25 and 25' or an abutting face 24, a boundary face 25 and a top face 26. The abutting face 24 is convex, as a result of which, in the situation where a main face 30' of the carrier 30 is in contact with the abutting face 24 under force, said main face 30' will centre on the abutting face 24. Such a situation occurs essentially when a transverse element 20 is located between the discs 4 and 5 or, respectively, 8 and 9 of one of the two pulleys 3 and 7, respectively.

Figure 3A:
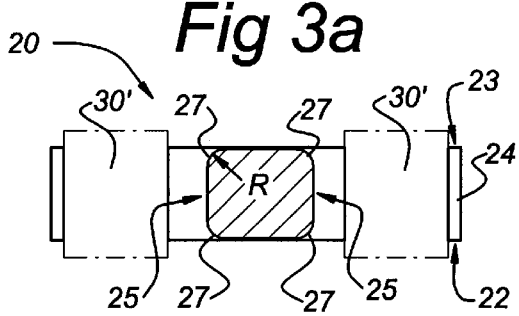
FIGS. 3a and 3b each show a cross-section of a transverse element.
Figure 3B:
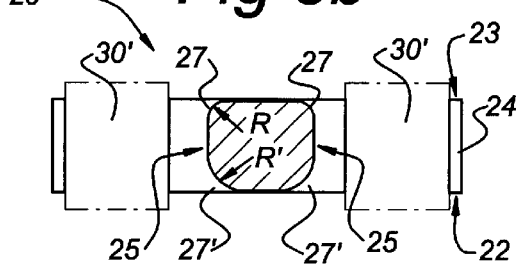

FIGS. 3a and 3b show the cross-section III—III from FIG. 2 of a transverse element 20 and 20', respectively. The transition edges 27 form the transition between, on the one hand, the boundary faces 25 and, on the other hand, the first main face 22 or the second main face 23. According to the invention at least one of the transition edges 27 is rounded with a radius of curvature R of less than 0.2 mm. the four edges 27 of transverse element 20 in FIG. 3a are all provided with a corresponding rounding R. As shown in FIG. 3b, it is also possible to round the edges 27 with differing radii of curvature R, R'. FIG. 3b shows a transverse element 20', the two transition edges 27' of which, between the first main face 22 and the boundary faces 25, have been rounded with a radius of curvature R' which is greater than the radius of curvature R with which the transition edges 27 between the second main face 23 and the boundary faces 25 have been rounded. Radius of curvature R' can be greater than, smaller than or equal to 0.2 mm, whilst radius of curvature R in accordance with the invention is less than 0.2 mm. Such a transverse element 20' provided with transition edges 27 and 27' rounded with differing radii of curvature R, R' can be preferable to a transverse element 20 provided with transition edges 27 rounded with identical radii of curvature R, for example because the drive belt 10 is used in one specific direction of movement C (see FIG. 5 during operation, or because of characteristics of the production process for the transverse elements 20, 20'. It has been found that the average of the radii of curvature R and R' in the drive belt 10 must be in the range of 0.15±0.15.

It is pointed out that in practice the set radius of curvature 27, 27' can be dependent on the method used for determination. One suitable method is so-called profile projection. In this method a transverse element 20, 20' is cut through the middle, for example along the cross-section III—III indicated in FIG. 2. A very fine grid is then placed or projected over the cross-section in some way or other. It is now possible to determine by eye, on the one hand, a first grid position where a main face 22, 23 ends and a transition edge 27, 27' starts and, on the other hand, a second grid position where the said transition edge 27, 27' ends and a boundary face 25, 25' starts. An average value for the radius of curvature of the said transition edge 27, 27' can be calculated easily with the aid of the said first and second grid positions and the fact that the said main face 22, 23 and the said boundary face 25, 25' are oriented virtually perpendicular to one another.

Figure 4A:
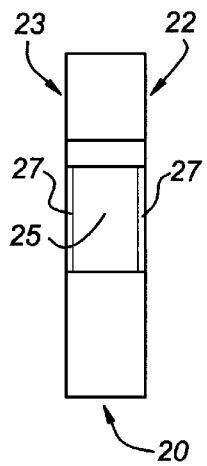
FIGS. 4a, 4b and 4c each show a view of a transverse element in a direction parallel to a main face of the transverse element.
Figure 4B:
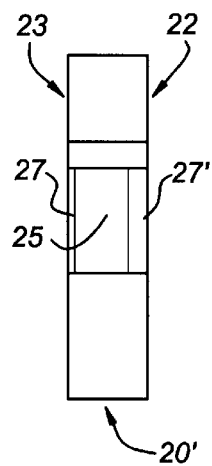
Figure 4C:
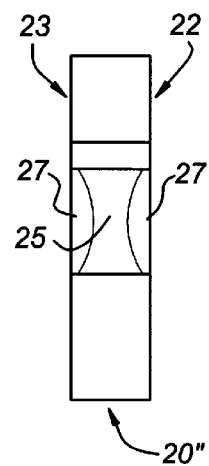

FIGS. 4a, 4b and 4c show a transverse element 20, 20' and 20', respectively, viewed in accordance with the side view B from FIG. 2. To aid clarity, the carrier 30 is not shown. The transverse element 20 in FIG. 4a is provided with transition edges 27 which have been rounded with the aid of the tumbling process with a radius of curvature that is essentially constant over the length of the transition edge 27 and, moreover, is relatively small. Corresponding to the transverse element 20' shown in FIG. 3b, transverse element 20' in FIG. 4b is provided with a transition edge 27 rounded with a relatively small radius of curvature and with a transition edge 27' rounded with a relatively large radius of curvature. The transverse element 20" in FIG. 4c has transition edges 27 such as are usually produced by the strip sanding process in the material of transverse element 20". Such a transition edge 27 is rounded with a radius of curvature which is relatively large and varies in the longitudinal direction of a transition edge 27. A varying radius of curvature is undesirable since this can result in excessive wear of the outer ends of the transverse element 20" and/or of the outer strip-shaped belts of the carrier 30.

Figure 5:
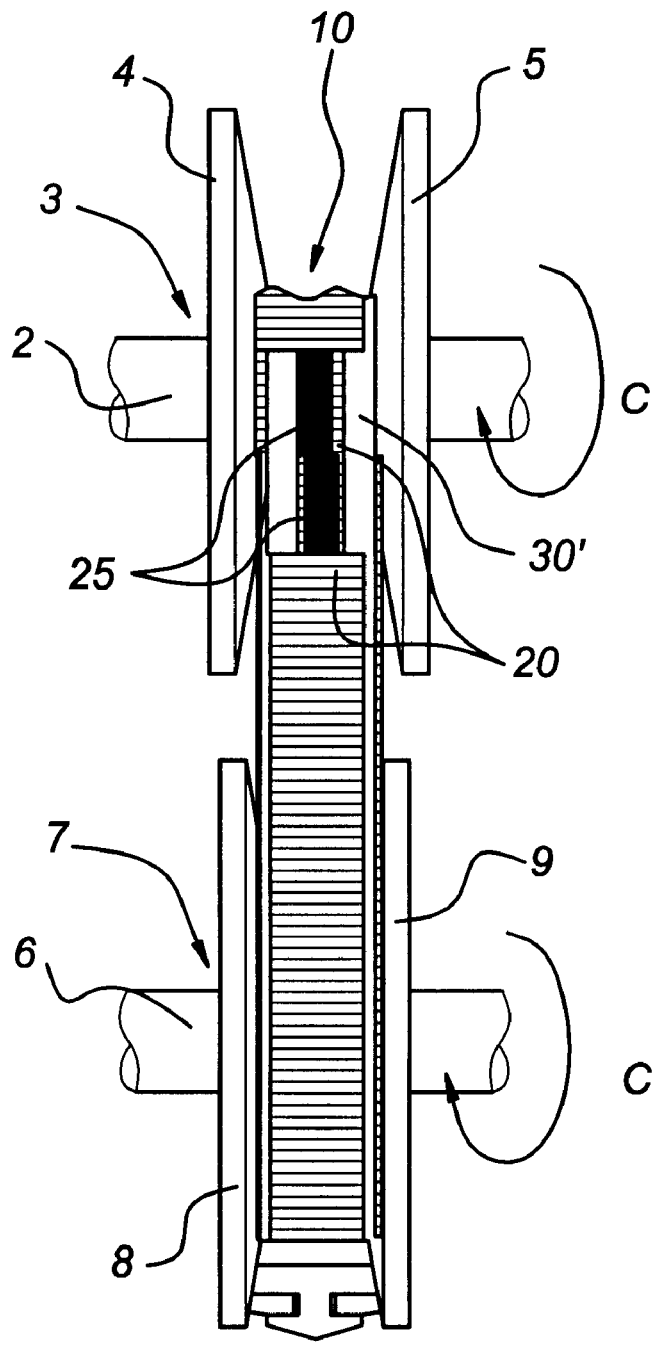
FIG. 5 shows a partial section of a drive belt according to the invention.

In the continuously variable transmission shown in FIG. 1 the said V-shaped grooves are precisely in the extension of one another only in at most two transition ratios, so that in the other transmission ratios of the transmissions the drive belt 10 has to bridge a certain transverse distance between the pulleys 3 and 7. This is termed misalignment of the drive belt 10. As a result of the misalignment, the carrier 30 of the drive belt 10 can come into contact with a boundary face 25, 25' of a transverse element 20. This is shown diagrammatically in FIG. 5. The drive belt 10 in FIG. 5 is shown partially in cross-section. Some of the transverse elements 20 of the drive belt 10 are clamped between the discs 4 and 5 of a pulley 3. As a result of the misalignment of the drive belt 10, both the carriers 30 and the transverse elements 20 have to bridge a certain transverse distance between the pulleys 3 and 7. As shown in FIG. 5, the transverse elements 20 are moved by the pulley disc 5 in the direction of the other pulley disc 4, during which movement a carrier 30 can come into contact with the boundary face 25 of a transverse element 20. In addition to the mutual axial displacement of carrier 30 and transverse element 20, which has been discussed above, the carrier 30 and transverse elements 20 will also move relative to one another in the longitudinal direction of the drive belt 10 during operation. Wear occurs as a consequence of carrier 30 and a boundary face 25, 25' coming into contact and the relative movement of the carrier and boundary face. In order to reduce the said wear, the transition edge 27, where a boundary face 25, 25' merges into the front main face 22 or the rear main face 23, is rounded. According to the invention the radius of curvature of the rounded transition edge 27 is less than 0.2 mm.

What is claimed is:

1. Drive belt (10) for a continuously variable transmission, as for use in motor vehicles, having transverse elements (20) and at least one endless carrier (30), wherein the transverse elements (20) are each provided with a recess (21) that extends between a first and a second main face (22 and 23, respectively) of the transverse element (20), which main faces are oriented transversely to the intended direction of movement (C) of the drive belt (10), that offers accommodation for the carrier (30) and that is at least bounded both by an abutting face (24) intended to come into contact with a main face (30') of the carrier (30), and by a boundary face (25), which is oriented transversely thereto and restricts the freedom of movement of the carrier (30) in the axial direction, the boundary face (25) merging into the first main face (22) and into the second main face (23) via transition edges (27), characterised in that the radius of curvature (R) of at least one transition edge (27) is less than 0.2 mm.

2. Drive belt (10) according to claim 1, characterised in that the radius of curvature (R) of the said transition edge (27) is greater than 0.01 mm.

3. Drive belt (10) according to claim 1, characterised in that the radius of curvature (R) of the said transition edge (27) is less than 0.15 mm.

4. Drive belt (10) according to claim 1, characterised in that the radius of curvature (R) of the said transition edge (27) is in the range of 0.08±0.07 mm.

5. Drive belt (10) according to claim 1, wherein the transverse elements (20) have at least two boundary faces (25), characterised in that the radius of curvature of at least two transition edges (27) is less than 0.2 mm and in that the said transition edges (27) directly abut the first or the second main face (22, 23).

6. Drive belt (10) according to claim 5, characterized in that the radius of curvature (R') of the transition edges (27'), other than said at least one transition edge (27), is greater than 0.2 mm.

7. Drive belt (10) according to claim 6, characterised in that the average value of the radii of curvature (R and R') of the transition edges (27 and 27') of the transverse elements (20) is in the range of 0.15±0.15 mm.

8. Drive belt (10) for a continuously variable transmission, as for use in motor vehicles, having transverse elements (20) and at least one endless carrier (30), wherein the transverse elements (20) are each provided with a recess (21) that extends between a first and a second main face (22 and 23, respectively) of the transverse element (20), which main faces are oriented transversely to the intended direction of movement (C) of the drive belt (10), that offers accommodation for the carrier (30) and that is at least bounded both by an abutting face (24) intended to come into contact with a main face (30') of the carrier (30), and by a boundary face (25), which is oriented transversely thereto and restricts the freedom of movement of the carrier (30) in the axial direction, the boundary face (25) merging into the first main face (22) and into the second main face (23) via transition edges (27), characterized in that the radius of curvature (R) of at least one transition edge (27) is less than 0.2 mm, and in that the radius of curvature (R') of at least one further transition edge (27') is greater than the radius of curvature (R) of the said transition edge (27).

9. Drive belt (10) according to claim 8, wherein the transverse elements (20) have at least two boundary faces (25), characterized in that the radius of curvature of at least two transition edges (27) is less than 0.2 mm and in that the said transition edges (27) directly abut the first or the second main face (22, 23).

10. Drive belt (10) according to claim 9, characterized in that the radius of curvature (R') of the other transition edges (27') is greater than 0.2 mm.

11. Drive belt (10) according to claim 10, characterized in that the average value of the radii of curvature (R and R') of the transition edges (27 and 27') of the transverse elements (20) is in the range of 0.15±0.15 mm.

12. Continuously variable transmission with a drive belt having transverse elements (20) and at least one endless carrier (30), wherein the transverse elements (20) are each provided with a recess (21) that extends between a first and a second main face (22 and 23, respectively) of the transverse element (20), which main faces are oriented transversely to the intended direction of movement (C) of the drive belt (10), that offers accommodation for the carrier (30) and that is at least bounded both by an abutting face (24) intended to come into contact with a main face (30') of the carrier (30), and by a boundary face (25), which is oriented transversely thereto and restricts the freedom of movement of the carrier (30) in the axial direction, the boundary face (25) merging into the first main face (22) and into the second main face (23) via transition edges (27), characterized in that the radius of curvature (R) of at least one transition edge (27) is less than 0.2 mm, and wherein the transverse elements (20) have at least two boundary faces (25), characterized in that the radius of curvature of at least two transition edges (27) is less than 0.2 mm and in that the said transition edges (27) directly abut the first or the second main face (22, 23), the radius of curvature (R') of the transition edges (27'), other than said at least one transition edge (27), is greater than 0.2 mm, and the average value of the radii of curvature (R and R') of the transition edges (27 and 27') of the transverse elements (20) is in the range of 0.15±0.15 mm.

* * * * *